Feb. 14, 1939.  F. W. ROLLAND  2,147,175
METHOD FOR MANUFACTURING DIAMOND DRILL BITS OR OTHER TOOLS
Filed Feb. 4, 1938  2 Sheets-Sheet 1
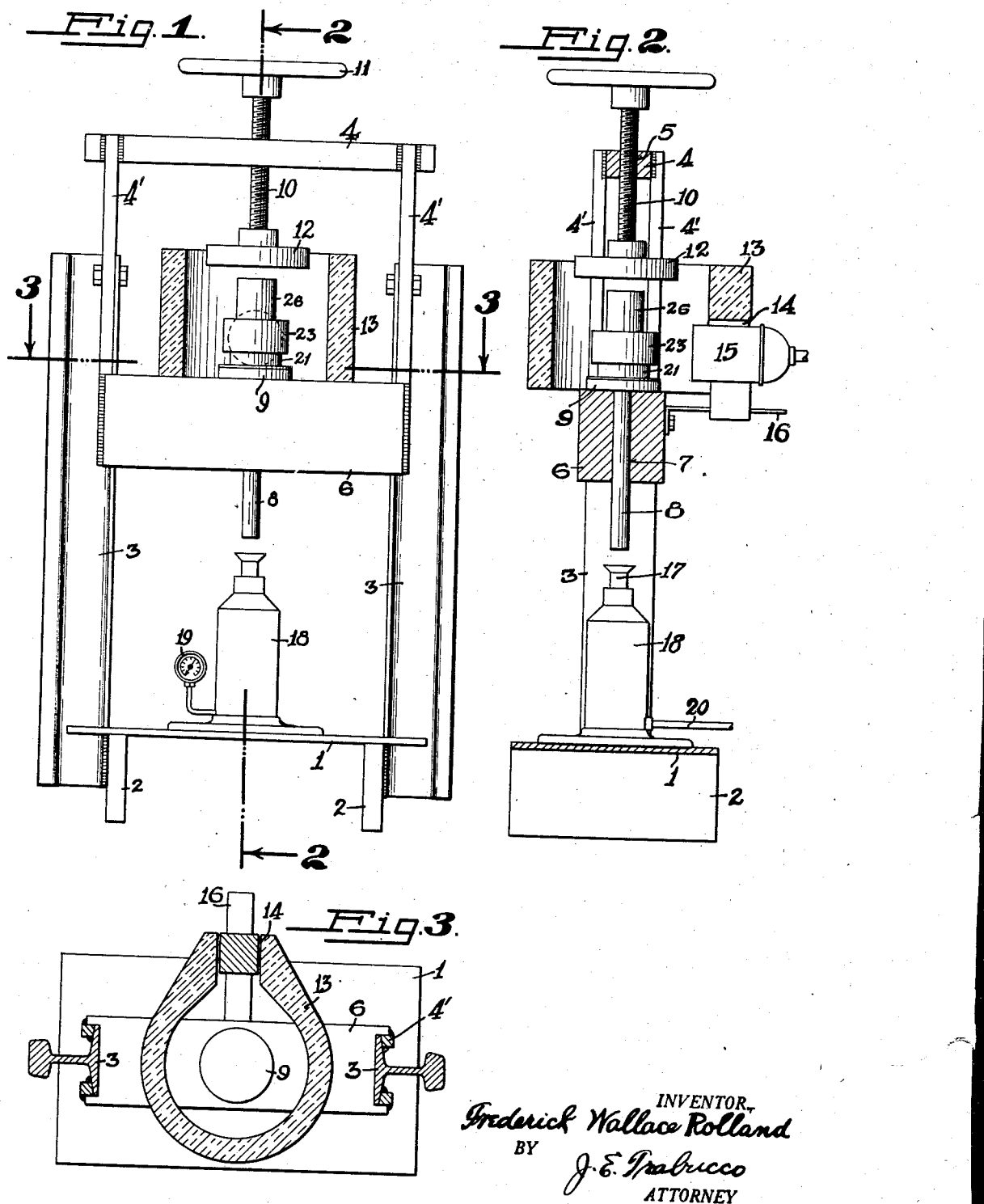
INVENTOR,
Frederick Wallace Rolland
BY
J. E. Trabucco
ATTORNEY Feb. 14, 1939.  F. W. ROLLAND  2,147,175
METHOD FOR MANUFACTURING DIAMOND DRILL BITS OR OTHER TOOLS
Filed Feb. 4, 1938  2 Sheets-Sheet 2
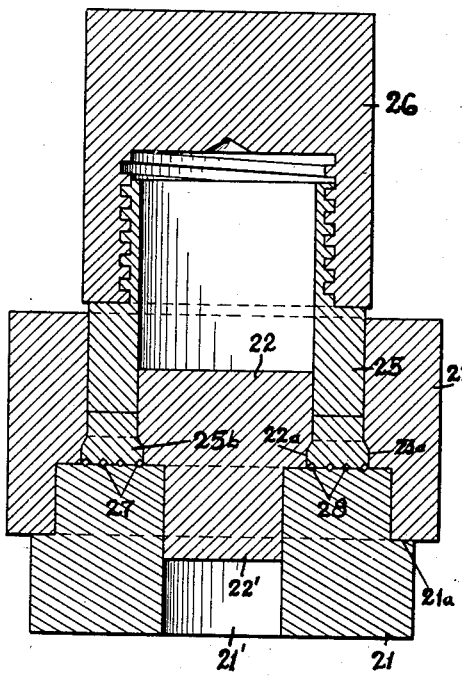
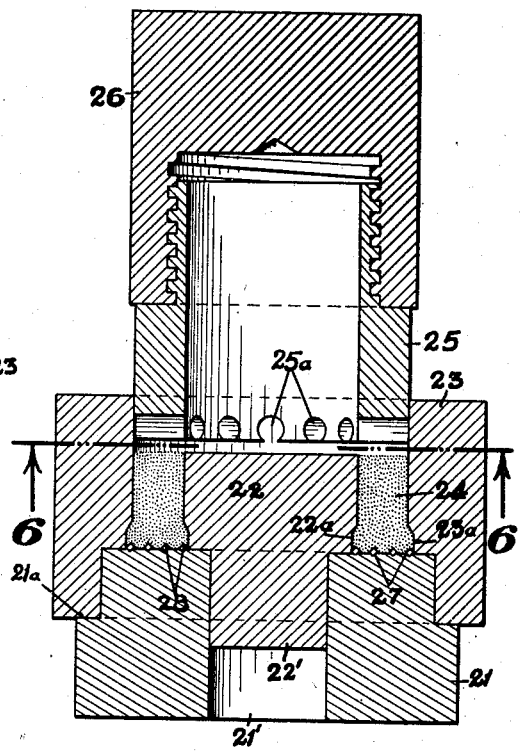
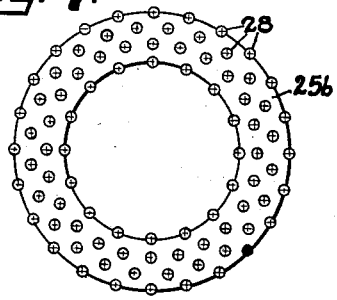
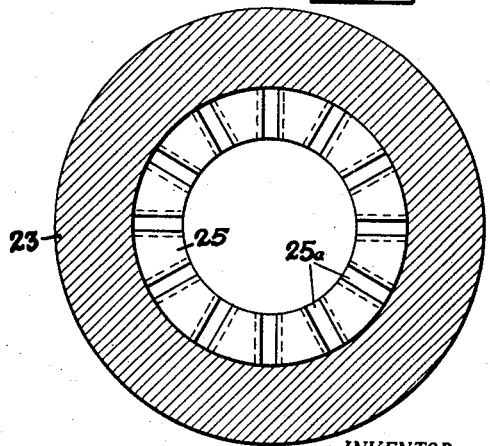
INVENTOR,
Frederick Wallace Rolland
BY
J. E. Trabucco
ATTORNEY Patented Feb. 14, 1939

2,147,175

UNITED STATES PATENT OFFICE 2,147,175

METHOD FOR MANUFACTURING DIAMOND DRILL BITS OR OTHER TOOLS

Frederick Wallace Rolland, Oakland, Calif.

Application February 4, 1938, Serial No. 188,663

3 Claims. (Cl. 76—108)

This invention relates to a novel method for manufacturing diamond drill bits or other tools.

It has heretofore been the common practice in manufacturing diamond drills to heat the drill to a fusing temperature when affixing diamonds to the cutting face thereof. Such a method has proven to be unsatisfactory, principally because the application of excessive heat to the diamonds so modifies their molecular structure as to make them less durable. The use of drills of this character is frequently accompanied by some of the diamonds becoming pulverized and destroyed, thereby making the costs incident to the use of equipment of this kind extremely high.

My invention presents a distinct improvement over the methods now commonly employed in manufacturing diamond drills in that it provides a novel pressure process by which a plurality of diamonds may be satisfactorily secured to the cutting face of a drill without the application of excessive or damaging heat.

An object of my invention is to provide a novel pressure process by which drills may be faced with diamonds or other abrasive elements.

Other and further objects of my invention will be pointed out hereinafter, indicated in the appended claims, or will be obvious to one skilled in the art upon an understanding of the present disclosure. For the purposes of this application I have elected to show herein certain forms and details of apparatus of the kind characterized representative of my invention; it is to be understood, however, that the embodiment of my invention shown on the drawings is for illustrative purposes only, and that therefore it is not to be regarded as exhaustive of the variations of the invention, nor is it to be given any interpretation such as might have the effect of limiting the claims, short of the true and most comprehensive scope of the invention in the art.

In the accompanying drawings:

Fig. 1 is a side elevation of apparatus employed in manufacturing diamond drills in accordance with my invention, showing the furnace wall in vertical section;

Fig. 2 is a sectional view taken on the line 2—2 of Fig. 1;

Fig. 3 is a sectional view taken on the line 3—3 of Fig. 1;

Fig. 4 is a vertical sectional view of the die which constitutes a part of my invention, showing a diamond drill in the process of manufacture;

Fig. 5 is a similar view, showing the diamond drill in its completed form;

Fig. 6 is a sectional view taken on the line 6—6 of Fig. 4; and

Fig. 7 is an end view of the completed diamond drill after being removed from the die.

Referring to the drawings, the numeral 1 designates a horizontal platform having supporting legs 2 extending downwardly therefrom. Secured to and extending upwardly from the opposite ends of the platform 1 are vertical columns 3. Bolted and welded to the columns 3 are upright frame members 4', and secured to the upper ends of the latter as by welding is a horizontal frame member 4 having a vertical threaded hole 5 provided centrally therein. Suitably positioned between the frame member 4 and the platform 1, and extending across the intervening space between the columns 3 with its ends secured to the latter as by welding, is a block 6 having its upper surface flat and preferably lying in a substantially horizontal plane. The block 6 is centrally provided with a vertical hole 7 through which a plunger 8 movably extends. The plunger extends beneath the block and is secured at its upper end to a circular or other suitably shaped plate 9 which normally rests upon the said block and is adapted to support a die.

Extending downwardly through the threaded opening 5 in the horizontal frame member 4 is a screw 10 having a hand wheel 11 secured to its upper end and a flat bottomed disc 12 attached to its lower end. The screw 10 and the plunger 8 are preferably positioned in vertical alignment so that a uniform pressure may be applied to a die positioned between the plate 9 and the disc 12.

Resting on the block 6 is a substantially cylindrical furnace wall 13 having a slotted vertical opening 14 at one side through which a burner 15 extends. The burner 15 is adjustably supported on a bracket 16 secured to the block 6. The furnace wall 13 is made preferably of refractory material, and it is so positioned as to laterally enclose a die supported on the plate 9.

Supported on the platform 1 with its upwardly disposed piston 17 positioned directly beneath the plunger 8 is a hydraulic jack 18 having a suitable pressure gauge 19 and a fluid supply conduit 20 associated therewith. The hydraulic jack 18 when operated in the usual manner by admitting fluid under pressure thereto actuates its piston 17 upwardly into engagement with the downwardly disposed end of the piston 8.

My invention contemplated the use of a die which in operation is normally positioned between and in engagement with the plate 9 and the disc 12. The die includes a suitably shaped base member 21 having a vertical opening 21' provided centrally therein which is so proportioned as to accommodate the downwardly disposed stem 22' of an annular core 22. The base member 21 normally rests on the plate 9 and its top side normally lies in a substantially horizontal plane. The base member is provided with an annular shoulder 21a which together with its upper side provides suitably supporting surfaces for a ring shaped member 23. The inside annular surface of the ring shaped member 23 is suitably spaced from the outer circumferential surface of the core 22, thereby providing a circular area for the positioning of a powdered or granular metal 24. The core 22 and the ring shaped member 23 are provided respectively with annular grooves 22a and 23a which are so positioned with respect to one another as to provide the annular intervening space between the core 22 and the ring shaped member 23 with an enlargement at its lower end. The enlargement provided at the lower end of the intervening space by the annular grooves 22a and 23a permits an annular enlargement to be formed on the tip of a manufactured drill so the latter can operate without undue friction. The ring shaped member 23 extends upwardly beyond the top of the core 22 thereby providing suitable means for engaging with and holding an annular steel drill or bit 25 in place while a diamond faced tip is being applied thereto in accordance with my invention. The drill 25 which is to be tipped with a diamond facing in accordance with my process is of a size adapted to fit in the intervening space between the core 22 and the member 23 and it is preferably provided with a series of substantially circular grooves 25a at its lower edge, the said grooves being open at their lower sides so as to permit a powdered metal to enter and become secured to the said drill when the tip is formed therein. The upper end of the drill 25 is threaded in the usual manner, and a screw cap 26 is ordinarily attached for protection purposes when the apparatus is to be operated.

The upper surface of the base member 21, at points within the intervening space defined by the inner side walls of the grooves 22a and 23a of the core 22 and the ring shaped member 23 respectively, is provided with a series of annularly arranged rows of depressions 27 within which a plurality of diamonds 28 are normally positioned. The inner and outer rows of depressions 27 are preferably positioned within the area formed by the grooves 22a and 23a respectively, thereby permitting an annular row of diamonds to be imbedded in the tip of drill at its inner circumferential edge and an annular row of diamonds to be imbedded in the said tip at its outer circumferential edge.

In facing the cutting end of a drill in accordance with my invention the diamonds are first placed in the depressions 27 at the top of the base member 21 after which the said base member, the core 22 and the ring shaped member 23 are assembled in the manner shown on the drawings and then placed on the plate 9. A granular or powdered metal alloy 24 comprising approximately ninety percent of copper and ten percent of tin is placed in the intervening space between the ring shaped member 23 and the core 22. The grooved end of a drill 25 having a screw cap 26 attached is inserted into the open top end of the ring shaped member 23 and in engagement with the powder 24. The handle 11 is then turned to move the disc 12 down upon the top of the cap 26. The burner 15 is thereupon operated to direct a flame against the ring shaped member 23. After the die has been heated to a temperature below that at which the metal alloy 24 fuses, preferably to about 1500 degrees Fahrenheit, the hydraulic jack is operated to cause its piston 17 to engage with and actuate the plunger 18 upwardly. Since the fusing temperature of the copper-tin alloy is in the neighborhood of 1949° F. it is advisable to maintain the temperature below this point, otherwise if the mass of alloy becomes thoroughly melted, the diamonds will rise to the top thereof and prevent the carrying out of the invention. A pressure of about two thousand pounds per square inch is exerted for about an hour and twenty minutes upon the die, thereby causing the powdered alloy 24 to enter the grooves 25a and form a solid integral and non-detachable tip 25b at the end of the drill. The elements comprising the metal alloy having an affinity for one another and for the steel from which the drill is made, unite to form an integral structure at the end of the said drill when subjected to a continued high pressure in accordance with my invention. The diamonds 28 become securely imbedded in the enlarged tip 25b of the drill and form an abrasive facing thereon.

It is to be understood that the apparatus shown and described herein as well as the materials employed in carrying out my invention are susceptible to changes in many respects. The powdered metal alloy 24 may include additional ingredients or other suitable proportions of the same or different ingredients, likewise the temperatures and pressures herein specified may vary considerably in accordance with the peculiarities of the particular metal alloy being used. My improved method and apparatus may be used in the manufacture of cutting tools of various kinds.

The granular metallic compound or alloy 24 may contain a substantial proportion of fine diamond particles, sometimes known as diamond dust, and a drill bit or other tool may be satisfactorily faced therewith in accordance with my invention. Should it be desirable to face a bit or other tool with a metallic compound containing diamond dust instead of with a plurality of diamonds, a suitable amount of the said compound is placed in the die, heat is applied as aforesaid, and with the bit or tool superimposed therein, a suitable pressure is applied in the manner herein described. The granulated metallic compound entering the grooves 25a becomes securely anchored at the end of the bit or tool upon the application of a suitable pressure for a predetermined period of time, thereby providing an integral abrasive facing or tip 25b which is impregnated throughout with small diamond particles.

Having described my invention what I claim is:

1. A method of facing tools with abrasive elements comprising positioning a plurality of diamonds in the bottom of a die, placing a mass of comminuted alloy consisting largely of copper and tin in the die above and in engagement with the diamonds, the particles of the said mass of alloy having an affinity for one another and for the material from which the tool to be so faced is made, placing the end of the tool to be faced with the diamonds in the die and in engagement with the top surface of the mass of alloy, heating the said mass of alloy to a temperature of approximately fifteen hundred degrees Fahrenheit, and applying a suitable pressure to the die so as to cause the elements of the mass of alloy to combine to form a solid tip secured at the end of the tool and within which the diamonds are partly imbedded.

2. The method of facing tools with diamonds which comprises placing a mass of comminuted alloy consisting largely of copper and tin having the ability to fuse at a temperature slightly less than 2000° F. between and in engagement with the end of a tool and a plurality of diamonds, heating the mass of alloy to a temperature less than the fusing temperature of the said alloy, and while maintaining the diamonds at one end of the said mass of alloy and the tool at the opposite end thereof, applying a high-pressure to the mass of alloy for a period of time sufficient to enable the particles of the said mass of alloy to unite with themselves and with the tool and the diamonds to form an integral and coherent tip affixed to the end of the tool.

3. A method of facing tools with abrasive material which comprises placing a mass of comminuted alloy consisting largely of copper and tin and impregnated with diamond dust, at one end of a tool to be faced, the said elements of said alloy having an affinity for one another and for the material of the tool, heating the mass of alloy to a temperature less than that at which the alloy fuses, and simultaneously subjecting the mass of alloy to a predetermined pressure for such a period as is required to cause the particles of the said alloy to unite with one another and with the tool to form an integral and coherent tip affixed to the tool.

FREDERICK WALLACE ROLLAND.